US010237129B2

(12) United States Patent
Krishnamoorthy

(10) Patent No.: US 10,237,129 B2
(45) Date of Patent: Mar. 19, 2019

(54) INTELLIGENT NETWORK ACCESS MODE CONFIGURATION BASED ON USAGE CONDITIONS

(71) Applicant: Aerohive Networks, Inc., Milpitas, CA (US)

(72) Inventor: Narayanan Krishnamoorthy, Milpitas, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

(21) Appl. No.: 15/723,114

(22) Filed: Oct. 2, 2017

(65) Prior Publication Data
US 2018/0097691 A1    Apr. 5, 2018

Related U.S. Application Data

(60) Provisional application No. 62/402,894, filed on Sep. 30, 2016.

(51) Int. Cl.
| | |
|---|---|
| *H04W 24/02* | (2009.01) |
| *H04L 12/24* | (2006.01) |
| *H04W 24/08* | (2009.01) |
| *H04L 12/26* | (2006.01) |
| *H04B 7/0413* | (2017.01) |

(52) U.S. Cl.
CPC ...... *H04L 41/0806* (2013.01); *H04L 43/0876* (2013.01); *H04W 24/02* (2013.01); *H04W 24/08* (2013.01); *H04B 7/0413* (2013.01)

(58) Field of Classification Search
CPC ........... H04L 41/0806; H04L 43/0876; H04W 24/02; H04W 24/08; H04B 7/0413
See application file for complete search history.

(56) References Cited

U.S. PATENT DOCUMENTS

| | | |
|---|---|---|
| 8,051,324 B1 | 11/2011 | Zhao |
| 9,154,247 B2 | 10/2015 | Altman |
| 9,319,913 B2 | 4/2016 | Raleigh |
| 9,674,731 B2 | 6/2017 | Raleigh |

(Continued)

OTHER PUBLICATIONS

Eddy, Nathan, "Tablet Adoption Growing Among Small Businesses," May 4, 2012 [retrieved online at http://www.eweek.com/mobile/tablet-adoption-growing-among-small-businesses on Dec. 19, 2017].

(Continued)

*Primary Examiner* — Lakeram Jangbahadur
(74) *Attorney, Agent, or Firm* — Sheppard, Mullin, Richter & Hampton LLP

(57) ABSTRACT

A first wireless operating mode of a plurality of wireless operating modes may be selected. The plurality of wireless operating modes may be related to a plurality of antenna configurations and a plurality of wireless radio frequencies. In some implementations, the selecting of the first wireless operating mode may be based on the identified power mode of the first digital device. The first wireless operating mode may be associated with a first antenna configuration of the plurality of antenna configurations. The first wireless operating mode may be associated with a first wireless radio frequency of the plurality of wireless radio frequencies for the data to be accessed by the first digital device over the wireless access device.

18 Claims, 7 Drawing Sheets

(56) References Cited

U.S. PATENT DOCUMENTS

| | | |
|---|---|---|
| 9,699,646 B2 | 7/2017 | Poon |
| 9,712,401 B2 | 7/2017 | Wright |
| 9,749,899 B2 | 8/2017 | Raleigh |
| 9,794,266 B2 | 10/2017 | Faccin |
| 9,807,644 B2 | 10/2017 | Ma |
| 9,838,269 B2 | 12/2017 | Wright |
| 9,942,796 B2 | 4/2018 | Raleigh |
| 2003/0154272 A1 | 8/2003 | Dillon |
| 2011/0119413 A1 | 5/2011 | Gulati |
| 2012/0089727 A1 | 4/2012 | Raleigh |
| 2012/0231785 A1 | 9/2012 | Poon |
| 2013/0086265 A1 | 4/2013 | Bao |
| 2013/0272227 A1* | 10/2013 | Gallagher .............. H04W 16/02 370/329 |
| 2014/0199962 A1 | 7/2014 | Mohammed |
| 2015/0236926 A1 | 8/2015 | Wright |
| 2015/0237519 A1* | 8/2015 | Ghai ..................... H04W 24/10 380/270 |
| 2016/0269928 A1 | 9/2016 | Kotecha |
| 2016/0360489 A1* | 12/2016 | Boodannavar ....... H04B 7/0413 |
| 2017/0366680 A1 | 12/2017 | Raleigh |
| 2018/0146395 A1 | 5/2018 | Kotecha |

OTHER PUBLICATIONS

King, Rachel, "Tablet Adoption to Grow by 40 Percent by 2016, Report Says," Apr. 18, 2012 [retrieved online at http://www.zdnet.com/article/tablet-adoption-to-grow-by-40-percent-by-2016-report-says/ on Dec. 19, 2017].

Mandalia, Ravi, "Apple Retina MacBook Pro Gets Haswell Chips, 802.11ac Wi-Fi and a Lower Price," Oct. 24, 2013 [retrieved online at http://www.modernreaders.com/apple-retina-macbook-pro-gets-haswell-chips-802-11ac-wi-fi-and-a-lower-price/991/ravim on Dec. 19, 2017].

* cited by examiner

INTELLIGENT NETWORK ACCESS MODE CONFIGURATION BASED ON USAGE CONDITIONS

CROSS-REFERENCE TO RELATED APPLICATIONS

This application claims priority to U.S. Provisional Patent Application No. 62/402,894, filed Sep. 30, 2016, which is incorporated by reference herein.

BACKGROUND

Entities may find it important to provide users with access to computer networks. Due to cost, convenience, and other factors, many computer networks are implemented as wireless computer networks without cables connecting end user digital devices to routers, bridges, or switches. Many wireless computer networks incorporate the functionalities of routers, bridges, switches, etc. into wireless access devices that communicate with end user digital devices using antennas, other wireless network hardware, and/or other wireless network software. As wireless network hardware and/or software has evolved, so too have wireless computer networking standards. End user devices may be configured only for one type of network access (e.g., a wireless network access mode that supports a single antenna or legacy hardware). Though it may be desirable to facilitate intelligent network access mode configuration (e.g., of wireless network access points) based on usage conditions of end-user devices, many systems and methods have not successfully implemented these types of configurations.

DETAILED DESCRIPTION

Figure 1:
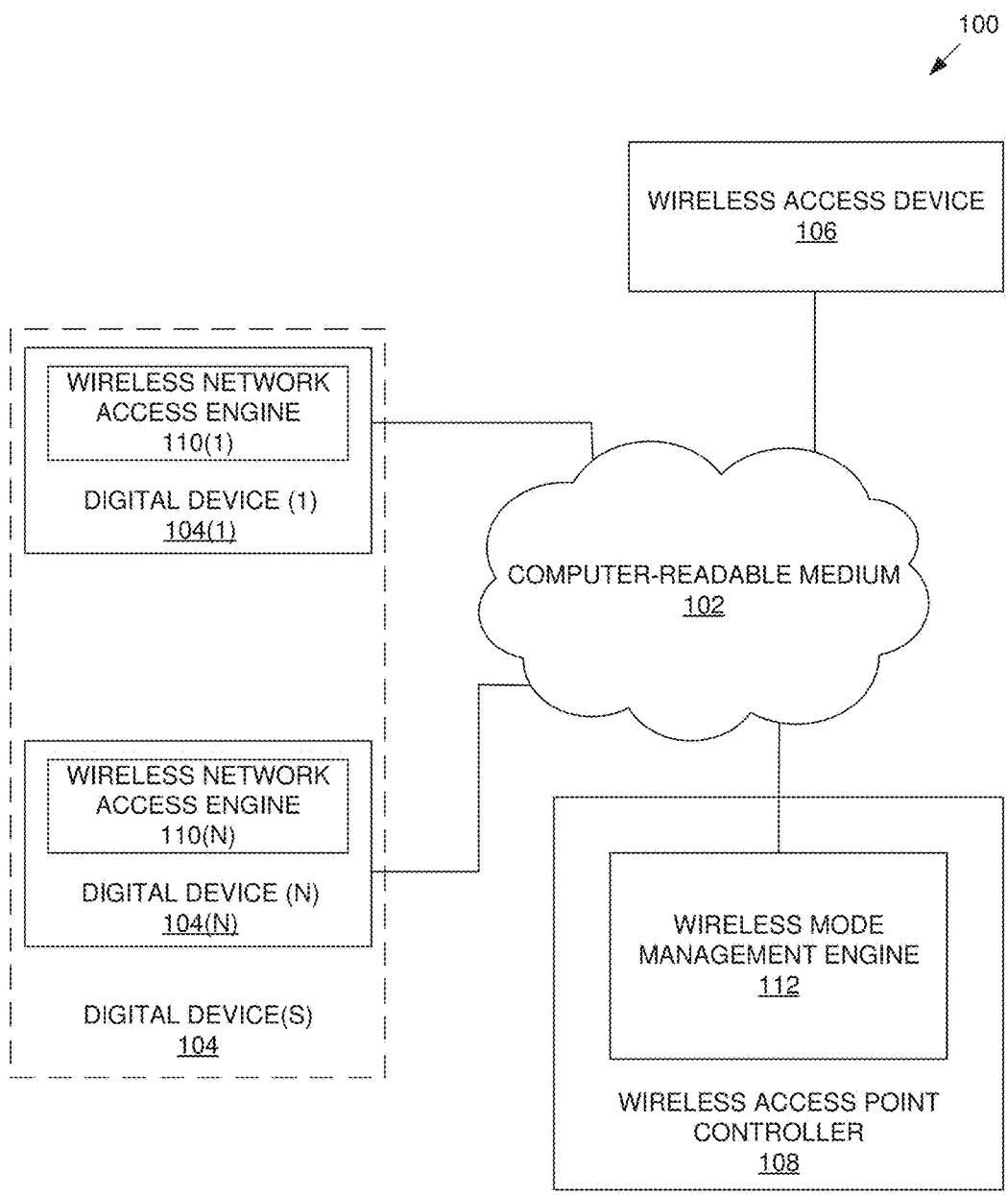
FIG. 1 is a diagram showing an example of an intelligent network access mode configuration system.

FIG. 1 is a diagram 100 showing an example of an intelligent network access mode configuration system. In the example of FIG. 1, the diagram 100 includes a computer-readable medium 102, one or more digital device(s) 104 (shown in FIG. 1 as a first digital device 104(1) through an Nth digital device 104(N)), a wireless access device 106, and a wireless access device controller 108. In the example of FIG. 1, the digital device(s) 104, the wireless access device controller 108, and the wireless access device 106 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent any one or more of a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the digital device(s) 104, the wireless access device controller 108, the wireless access device 106, and/or other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In some implementations, the computer-readable medium 102 supports one or more Wi-Fi connections between the digital device(s) 104 and the wireless access device 106. The computer-readable medium 102 may support IEEE 802.11 protocols, including but not limited to IEEE 802.11 a/b/g/n/ac protocols, etc. The computer-readable medium 102 may support IEEE 802.3 protocols. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11, implemented in 2007, has had subsequent amendments. These standards provide the basis for wireless network products using the Wi-Fi® brand. Technical specifications of IEEE 802.1, 802.3, and 801.11 are hereby incorporated by reference as if set forth fully herein.

In the example of FIG. 1, the digital device(s) 104 are intended to represent digital devices configured to facilitate access to the computer-readable medium 102 for users. The digital device(s) 104 may comprise a mobile phone, a tablet computing device, a laptop computer, a desktop computer, etc. In some implementations, the digital device(s) 104 comprise circuitry configured to facilitate access to the computer-readable medium 102. Examples of circuitry that can be used to facilitate access to the computer-readable medium 102 include: antennas, power circuitry, hardware, firmware, etc.

In the example of FIG. 1, the digital device(s) 104 include a wireless network access engine 110 that configures/instructs/incorporates therein the circuitry that is used to facilitate access to the computer-readable medium 102. The wireless network access engine 110 and/or the circuitry used to facilitate access to the computer-readable medium 102 is intended to represent an engine configured to facilitate access to a specific wireless operating mode of a plurality of wireless operating modes supported by the wireless access device 106. A "wireless operating mode," as used herein, may refer to a configuration of the wireless access device 106 that is used to support transfer of data to/from the digital device(s) 104 according to a specific wireless transfer protocol. In various implementations, a wireless network access condition of a digital device 104 is associated with a network access configuration of the digital device 104. A "network access configuration," as used herein, may refer to a specific configuration of a digital device 104 that supports a specific use and/or application of data from the computer-readable medium 102.

A network access configuration may include one or more configurations of antennas (e.g., a single antenna, a specific Multiple Input Multiple Output (MIMO) antenna array (3×3:3, 4×4:4, etc.), etc.) on the wireless access device 106 that allows transfer of data to/from the digital device(s) 104. A network access configuration may include a specific frequency that the wireless access device 106 uses to transfer data to/from the digital device(s) 104. Examples of frequencies that may be used include a 2.4 Gigahertz (GHz) frequency (e.g., for an 801.11n configuration), and a 5 GHz frequency (e.g., for 801.11ac configurations). In some implementations, a network access configuration is related to a specific 801.11ac configuration (e.g., a Wave1 configuration, a Wave2 configuration, etc.).

In various implementations, the network access configuration may optimize delivery and/or streaming of video to the digital device(s) 104. More particularly, the network access configuration may comprise configurations of antennas, wireless access parameters, ports, etc. on a digital device 104 that allows video to be streamed to multiples of the digital device(s) 104. The network access configuration may optimize desktop virtualizations represented on a digital device 104. A "desktop virtualization," as used herein, may comprise application used to represent a user interface of a remote computer (e.g., a computer coupled to a digital device 104 over the computer-readable medium 102) on a digital device 104. Desktop virtualization may comprise virtualized and/or streaming applications and/or other virtualized and/or streaming software.

In some implementations, the wireless network access engine 110 and/or the circuitry used to facilitate access to the computer-readable medium 102 is configured to provide a wireless network usage condition. A "wireless network usage condition," as used herein, may refer to any condition that provides an indicator of the amount, format, types, etc. of data to be accessed by a digital device 104 over the computer-readable medium 102. Wireless network usage conditions may be associated with power modes of a digital device 104. The power modes may correspond to the extent the circuitry used to facilitate access to the computer-readable medium 102 is configured to draw battery power to access the computer-readable medium 102 in order to access data. As an example of association with power modes, a wireless network usage condition may be associated with a lower-power configuration of a digital device 104 in which the digital device 104 is configured to access only a single antenna of the wireless access device 106. As another example, a wireless network usage condition may be associated with a higher-data throughput mode configuration of a digital device 104 in which the digital device 104 is configured to access only a multiple antennas (e.g., a MIMO antenna array) of the wireless access device 106. It is noted that a wireless network usage condition may be associated with factors other than antenna arrays that affect the power of a digital device 104 when the digital device 104 is accessing the computer-readable medium 102.

In the example of FIG. 1, the wireless access device 106 is coupled to the computer-readable medium 102. In some implementations, the wireless access device 106 supports wireless access of digital device(s) 104 to a LAN/WAN/the Internet represented in part by the computer-readable medium 102. To this end, the wireless access device 106 may support 801.11n, 802.11ac, and/or other wireless connections to the digital device(s) 104. The wireless access device 106 may be coupled to the wireless access device controller 108 over a LAN/WAN/Internet connection. The wireless access device 106 may be "controller-less;" e.g., control engines that configure the wireless access device 106 may be located remotely from the wireless access device 106. In various implementations, the wireless access device 106 may receive instructions to select, manage, etc. wireless operating modes from engines of the wireless access device controller 108 and/or other modules. As an example, the wireless access device 106 may receive instructions over a LAN/WAN/Internet connection to select, manage, etc. wireless operating modes from the wireless mode management engine 112. The wireless access device 106 may support one or more wireless operating modes. In some implementations, the wireless access device 106 supports an 801.11n wireless operation mode, and/or one or more 801.11ac wireless operation modes (e.g., Wave1 operation modes, Wave2 operation modes, etc.). It is explicitly noted that the controller-less design is intended to be illustrative, and not intended to be limiting, and that the modules of the wireless access device controller 108 and/or the wireless mode management engine 112 may be located in the wireless access device 106 and/or any other digital device discussed herein.

In the example of FIG. 1, the wireless access device controller 108 is intended to represent an engine that provides instructions over a WAN/LAN/Internet connection embodied in the computer-readable medium 102 to control wireless operating modes of the wireless access device 106. The wireless access device controller 108 may be located remotely from the wireless access device 106 and/or may support cloud-control (e.g., instructions over the Internet) of the wireless access device 106. In the example of FIG. 1, the wireless access device controller 108 includes a wireless mode management engine 112. The wireless mode management engine 112 may be configured to facilitate selection and/or management of wireless operating modes of the wireless access device 106. The wireless mode management engine 112 may be configured to identify wireless network usage conditions of digital device(s) 104. The wireless mode management engine 112 may be configured to identity power modes of the digital device(s) 104. In various implementations, the wireless mode management engine 112 is configured to select wireless operating modes based on the power modes. The wireless mode management engine 112 may be configured to provide instructions (either directly or through the wireless access device 106) to configure digital device(s) 104 to operate in accordance with a selected wireless operating mode.

The diagram 100 illustrates an intelligent network access mode configuration system that is intended to represent a system that operates to allow the digital device(s) 104 to access data from the wireless access device 106 in accordance with one or more wireless operating modes. In various implementations, the wireless network access engine(s) 110 on digital device(s) 104 may provide information about wireless network usage conditions that represent power modes, and/or the amounts, types, etc. of data that the digital device(s) 104 may use over the computer-readable medium 102. The information may be provided to the wireless access device 106 over a wireless connection supported by the wireless access device 106. The wireless access device 106 may provide the information about the network usage condition to the wireless access device controller 108, which, in turn, may identify digital device(s) 104 and identify power modes associated with the network usage condition using the wireless mode management engine 112. The wireless mode management engine 112 may operate to select a wireless operating mode. The wireless operating mode may represent antenna configurations and/or wireless radio frequencies supported by the wireless access device 106 for a specific wireless network access configuration. The wireless mode management engine 112 may provide to the wireless access device 106 instructions to configure digital device(s) 104 to operate in accordance with wireless operating modes.

Figure 2:
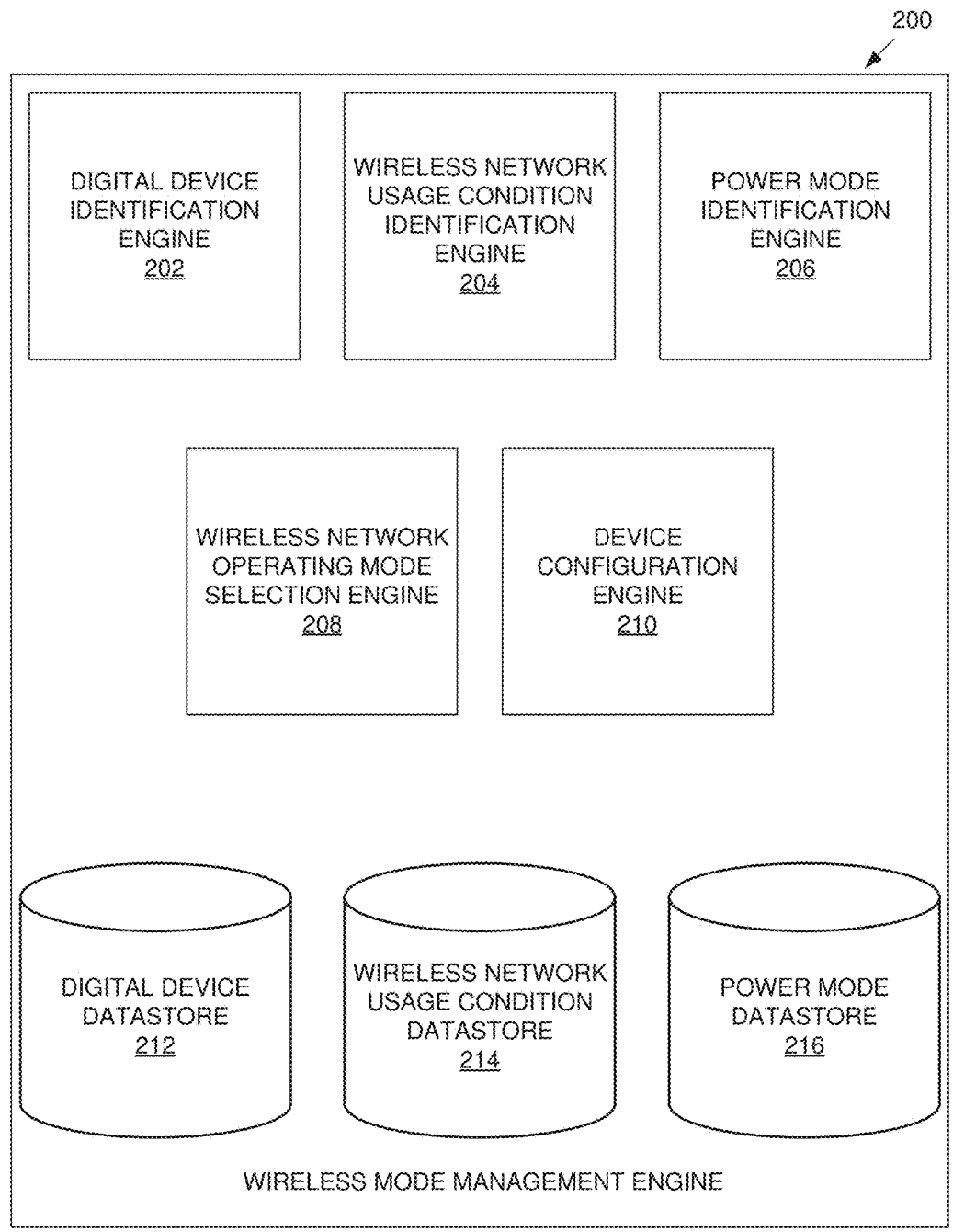
FIG. 2 is a diagram showing an example of a wireless mode management engine.

FIG. 2 is a diagram 200 showing an example of a wireless mode management engine. The wireless mode management engine may, but need not, correspond to the wireless mode management engine 112 of FIG. 1. In the example of FIG. 2, the diagram 200 includes a digital device identification engine 202, a wireless network usage condition identification engine 204, a power mode identification engine 206, a wireless network operating mode selection engine 208, a device configuration engine 210, a digital device datastore 212, a wireless network usage condition datastore 214, and a power mode datastore 216. One or more of the digital device identification engine 202, the wireless network usage condition identification engine 204, the power mode identification engine 206, the wireless network operating mode selection engine 208, the device configuration engine 210, the digital device datastore 212, the wireless network usage condition datastore 214, and the power mode datastore 216 may be coupled to one another or to modules not explicitly shown in FIG. 2.

In the example of FIG. 2, the digital device identification engine 202 is intended to represent an engine configured to gather from the digital device datastore 212 identifiers of one or more digital devices coupled to a wireless access device. The identifiers of digital devices may be indexed in any convenient format, including by Media Access Control (MAC) identifier, by associated Internet Protocol (IP) address, and by username of associated users. In some implementations, the digital device identification engine 202 gathers identifiers of digital devices that are either already receiving data from/providing data to a wireless access device. In various implementations, the digital device identification engine 202 gathers identifiers of digital devices that are attempting to access a wireless access device. The digital device identification engine 202 may provide identifiers of digital devices to other modules, such as the wireless network usage condition identification engine 204.

In the example of FIG. 2, the wireless network usage condition identification engine 204 is intended to represent an engine configured to gather from the wireless network usage condition datastore 214 one or more identifiers of wireless network usage conditions of digital devices. The wireless network usage conditions may provide one or more indicators of data that digital devices seek to access over a wireless access device. The wireless network usage conditions may, for instance, associated with one or more wireless network access configurations of digital devices. The wireless network access configurations may, but need not, be associated with an IEEE antenna configuration. As an example, the wireless network access configuration may be associated with an IEEE 802.11n MIMO antenna configuration. As another example, the wireless network access configuration may be associated with an IEEE 802.11ac antenna configuration, including, but not limited to a Wave1 antenna configuration or a Wave2 antenna configuration.

The wireless network access configuration may optimize delivery of video to one or more digital devices. As an example, the wireless network access configuration may optimize delivery of video to a set of digital devices that are seeking to stream a video at the same time (e.g., may optimize delivery of video to a set of tablet computing devices seeking to stream a classroom video at the same time). The wireless network access configuration may optimize delivery of collaborative video over platforms such as GoToMeeting, Webex, Facetime, etc., to entities, such as businesses. The wireless network access configuration may account for the fact that collaborative video applications may require real-time video, and possibly consume large amounts of bandwidth and/or appear to be choppy in terms of bandwidth usage. In some implementations, the wireless network access configuration may account for collaborative video by adopting 40 MHz (instead of 20 MHz) channels, and by using 5 GHz (instead of 2.4 GHz) frequencies. The wireless network access configuration may account for the use of educational videos in classrooms (e.g., may account for the situation where students on digital devices are attempting to stream one video at the same time). As an example of a K-12 environment with 30-40 tablet computing devices, the K-12 environment may be reduced to a 1×1 802.11n configuration. Even if the wireless access device 106 in this scenario is a 2×2:2 or a 3×3:3 wireless access device it may be hard to support stable streaming of video at speeds greater than 1 Megabyte per second (Mbps)). To overcome these and other limitations, digital device(s) 104 may need to be configured to be 2×2:2 or 3×3:3 802.11n clients or a 1×1:1 802.11ac client. Additional concerns, such as battery life, space and future-proofing concerns may drive the decision to choose a single 802.11ac client. The wireless network access configuration may accommodate these and other concerns.

In some implementations, the wireless network access configuration may optimize desktop virtualizations on digital devices. The wireless network access configuration may, e.g., configure a set of digital devices so that they can access virtualization software at disparate times or at the same time. The wireless network usage condition identification engine 204 may be configured to provide wireless network usage conditions to other modules, such as the power mode identification engine 206. In various implementations, the wireless network access configuration may optimize cloud applications executing on digital devices. More particularly, the wireless network access configuration may maximize upload speeds to ensure cloud applications are optimized. In various implementations, the wireless network access configuration may optimize high-demand regions of an Enterprise executing on digital devices.

In the example of FIG. 2, the power mode identification engine 206 is intended to represent an engine configured to gather from the power mode datastore 216 one or more identifiers of power modes of digital devices. In various implementations, the power modes may be associated with wireless network usage conditions of the digital devices. As an example, the power mode may be associated with a lower-power mode that allows digital devices to access, e.g., less antennas, or to access a network at a lower data rate. As another example, the power mode may be associated with a higher-power mode that allows digital devices to access, e.g., more antennas, or to access a network at a higher data rate. The power mode may, but need not, be related to network access configurations, in that the power mode may be related to an 801.11n network access configuration or an 802.11ac network access configuration. The power mode identification engine 206 may be configured to provide power modes to other modules, such as the wireless network operating mode selection engine 208.

In the example of FIG. 2, the wireless network operating mode selection engine 208 is intended to represent an engine configured to select a wireless operating mode. The wireless operating mode may be one of a plurality of wireless operating modes. Each of the plurality of wireless operating modes may be associated with a specific antenna configuration and/or a plurality of wireless radio frequencies. As an example, each wireless operating mode may be associated with a single antenna, a set of MIMO antennas, etc. As another example, each wireless operating mode may be associated with a 2.4 GHz operating frequency, a 5 GHz frequency, or some combination thereof that implements a particularly IEEE 802.11 standard. The wireless network operating mode selection engine 208 may be configured to provide a selected operating mode to other modules, such as the device configuration engine 210.

In the example of FIG. 2, the device configuration engine 210 is intended to represent an engine configured to provide instructions to configure an access device or a digital device to operate in accordance with a selected wireless operating mode. In various implementations, the device configuration engine 210 includes and/or cooperates with a network interface to provide instructions over a WAN/Internet connection to configure an access device or digital device to operate in accordance with a selected wireless operating mode.

In some implementations, the digital device datastore 212 is intended to represent a datastore configured to store identifiers of digital devices coupled to a wireless access device. The identifiers of digital devices may be indexed in any convenient format, including by Media Access Control (MAC) identifier, by associated Internet Protocol (IP) address, and by username of associated users. The wireless network usage condition datastore 214 may be configured to store identifiers of wireless network usage conditions of digital devices. In some implementations, the identifiers of wireless network usage conditions are based on user preferences, actual use of digital devices, and/or other factors. The power mode datastore 216 may be configured to store identifiers of power modes of digital devices. The power modes of digital devices may, but need not, be selected by developers of digital devices when developing/deploying digital devices for various purposes. Though the components 212, 214, and 216 are shown as "datastores," in FIG. 2, it is noted in various implementations, the components 212, 214, and 216 may be implemented without storage.

In the example of FIG. 2, the diagram 200 illustrates a wireless mode management engine that operates to configure a wireless access device to operate in accordance with one or more wireless operating modes. The digital device identification engine 202 may operate to gather from the digital device datastore 212 identifiers of one or more digital devices coupled (e.g., wirelessly coupled) to a wireless access device. The digital device identification engine 202 may operate to provide identifiers of digital devices to the wireless network usage condition identification engine 204. The wireless network usage condition identification engine 204 may operate to gather from the wireless network usage condition datastore 214 identifiers of wireless network usage conditions of digital devices. As noted herein, the wireless network usage condition may provide one or more indicators of data to be accessed by the first digital device over the wireless access device. The power mode identification engine 206 may operate to gather from the power mode datastore 216 identifiers of power mode(s) of digital devices. The power mode may, but need not, be associated with the wireless network usage condition of various digital devices. The wireless network operating mode selection engine 208 may operate to select one or more of a plurality of wireless operating modes. In various implementations, each of the plurality of wireless operating modes may be associated with and/or related to a specific antenna configuration of a wireless access device. Each of the plurality of wireless operating modes may be related to a specific wireless radio frequency of a wireless access device. In various implementations, the wireless network operating mode selection engine 208 bases its selections on identified power modes of digital devices. The device configuration engine 210 may operate to provide instructions to configure wireless access devices to operate in accordance with a selected operating mode.

Figure 3:
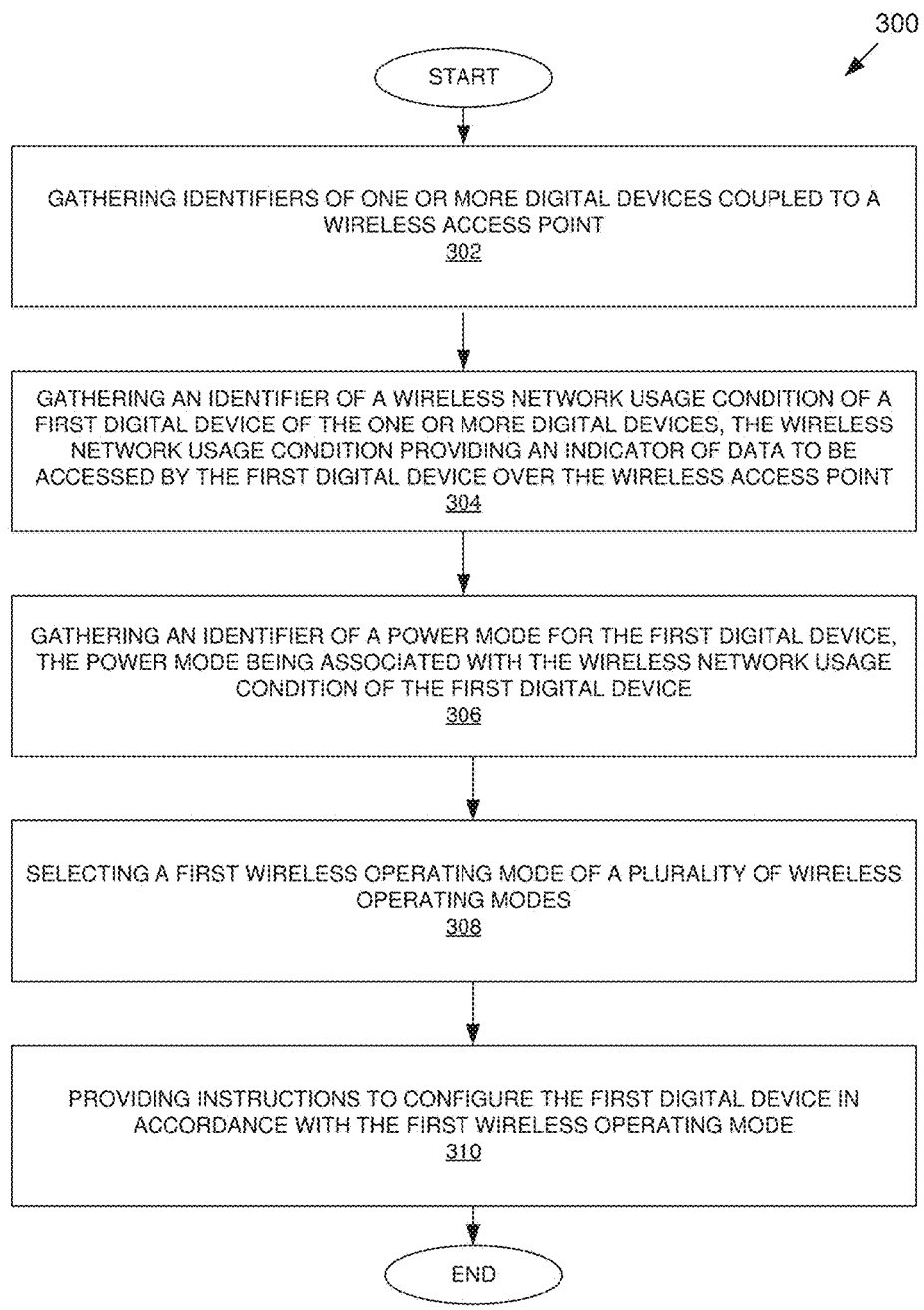
FIG. 3 is a flowchart of an example of a method for intelligently configuring an access point to select a wireless operating mode of a plurality of wireless operating modes.

FIG. 3 is a flowchart 300 of an example of a method for intelligently configuring an access point to select a wireless operating mode of a plurality of wireless operating modes. The flowchart 300 is discussed in conjunction with the modules of the wireless mode management engine 200, shown in FIG. 2 and discussed further herein. It is noted the flowchart 300 may have greater or fewer blocks than those explicitly shown. It is further noted the flowchart 300 may be enabled by structures other than the structures of the wireless mode management engine 200.

In the example of FIG. 3, the flowchart 300 starts at block 302 where identifiers of one or more digital devices coupled to a wireless access device are gathered. The digital device identification engine 202 may gather from the digital device datastore 212 identifiers of one or more digital devices that seek access to a wireless access device. The identifiers may identify the digital devices by MAC address, last known IP address, last known username associated with the digital devices, etc. In some implementations, the identifiers correspond to identifiers of digital devices known to have used the wireless access device at previous times. The digital device identification engine 202 may provide device identifiers to other modules, such as the wireless network usage condition identification engine 204.

The flowchart 300 continues to block 304 where an identifier of a wireless network usage condition of a first digital device of the one or more digital devices is gathered. In various implementations, the wireless network usage condition may provide an indicator of data to be accessed by the first digital device over the wireless access device. The wireless network usage condition identification engine 204 may gather, from the wireless network usage condition datastore 214, one or more identifiers of wireless network usage conditions. The wireless network usage conditions may, but need not, provide an indicator of data to be accessed by the first digital device over the wireless access device. In some implementations, the wireless network usage condition may be associated with one or more network access configurations of the digital device. The network access configurations may comprise an IEEE 802.1n MIMO antenna configuration, an 802.11ac Wave1 antenna configuration, an 802.11ac Wave 2 antenna configuration, etc. The network access configuration may, but need not, optimize delivery of video to the first digital device. In some implementations, the network access configuration may optimize desktop virtualizations represented on the digital device. In various implementations, the network access configuration is associated with a specific high-demand region that is characterized by an increased demand for wireless data from the wireless access point in comparison to a demand of a second digital device of the plurality of digital devices. The wireless network usage condition identification engine 204 may provide the wireless network usage condition identifier to the power mode identification engine 206.

The flowchart 300 continues to block 306 where an identifier of a power mode for the first digital device is gathered. The power mode may be associated with the wireless network usage condition of the first digital device. In some implementations, the power mode identification engine 206 may gather from the power mode datastore 216 identifiers of power modes associated with the network usage condition. The power modes gathered may represent the extent the first digital device is configured to use battery power to access various network resources. The power mode identification engine 206 may provide the identifier of the power mode to the wireless network operating mode selection engine 208.

The flowchart 300 continues to block 308 where a first wireless operating mode of a plurality of wireless operating modes is selected. Each of the plurality of wireless operating modes may be related to a plurality of antenna configurations and a plurality of wireless radio frequencies. The selecting of the first wireless operating mode may be based on an identified power mode. The first wireless operating mode may be associated with a first antenna configuration of the plurality of antenna configurations. The first wireless operating mode may be associated with a first wireless radio frequency of the plurality of wireless radio frequencies. In various implementations, the wireless network operating mode selection engine 208 may select a first wireless operating mode of a plurality of wireless operating modes, where the plurality of wireless operating modes is related to a plurality of antenna configurations and a plurality of wireless radio frequencies. The selection by the wireless network operating mode selection engine 208 may be based on the identified power mode of the first digital device. As noted herein, the first wireless operating mode may be associated with a first antenna configuration of the plurality of antenna configurations, and a first wireless radio frequency of the plurality of wireless radio frequencies for the data to be accessed by the first digital device over the wireless access point The flowchart 300 continues to block 310 where instructions to configure the first digital device in accordance with the first wireless operating mode are provided. More particularly, the device configuration engine 210 may provide instructions to configure the first digital device in accordance with the first wireless operating mode.

Figure 4:
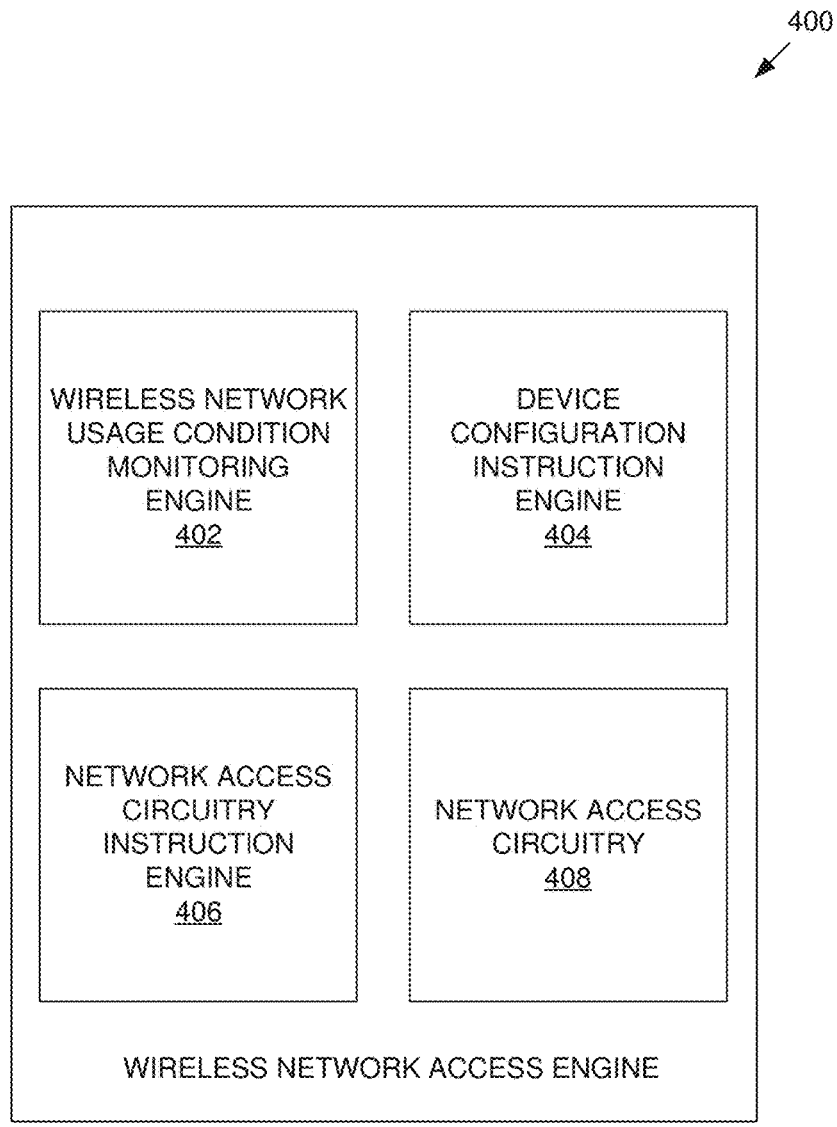
FIG. 4 is a diagram showing an example of a wireless network access engine.

FIG. 4 is a diagram 400 showing an example of a wireless network access engine. The wireless network access engine may, but need not, correspond to the wireless network access engine 110. In the example of FIG. 4, the diagram 400 includes a wireless network usage condition monitoring engine 402, a device configuration instruction engine 404, a network access circuitry instruction engine 406, and network access circuitry 408. One or more of the wireless network usage condition monitoring engine 402, the device configuration instruction engine 404, the network access circuitry instruction engine 406, and the network access circuitry 408 may be coupled to one another or to modules not explicitly shown in FIG. 4.

In the example of FIG. 4, the wireless network usage condition monitoring engine 402 is intended to represent an engine configured to monitor wireless network usage, including factors such as wireless network usage conditions that provide indicators of data that are to be accessed by a digital device. The wireless network usage conditions, in various implementations, may be associated with power modes of a digital device. The power modes may, but need not, correspond to the extent the network access circuitry 408 (and/or other components of a digital device) are configured to draw battery power to access data from a network. The power modes may comprise a lower-power mode that facilitates access to, e.g., a single antenna of a wireless access device. The power modes may comprise, e.g., a higher-data throughput mode that facilitates access to multiple antennas of a wireless access device. The wireless network usage condition monitoring engine 402 may be configured to provide wireless network usage to other modules, such as the device configuration instruction engine 404.

In the example of FIG. 4, the device configuration instruction engine 404 is intended to represent an engine configured to provide instructions to configure a digital device. The device configuration instruction engine 404 may be configured to provide instructions to configure numbers, types, intensities, etc. of antennas, configure radios (e.g., radio operating frequencies), etc. of digital devices. In various implementations, the device configuration instruction engine 404 configures a digital device to access an 802.11n network and/or radios and relevant antenna arrays of an 802.11n network maintained by a wireless access device. In some implementations, the device configuration instruction engine 404 configures a digital device to access an 802.11ac Wave1 network or an 802.11ac Wave1 network, and/or radios and relevant antenna arrays of an 802.11ac Wave1 network/802.11ac Wave2 network maintained by a wireless access device. The device configuration instruction engine 404 may provide configuration instructions over any computer-readable medium, including but not limited to hardware buses etc. on a digital device. The device configuration instruction engine 404 may be configured to provide device configuration instructions to various modules, such as the network access circuitry instruction engine 406.

In the example of FIG. 4, the network access circuitry instruction engine 406 is intended to represent an engine configured to process device configuration instructions, and may translate the device configuration instructions into specific hardware-level routines that involve the network access circuitry 408. In various implementations, the network access circuitry instruction engine 406 includes firmware and/or device drivers that translate device configuration instructions into firmware/device-level instructions that the network access circuitry 408 can process. The network access circuitry instruction engine 406 may provide firmware/device-level instructions to various modules, such as the network access circuitry 408.

In the example of FIG. 4, the network access circuitry 408 is intended to represent circuitry that is used to facilitate access to a wireless network. The network access circuitry 408 may include antennas, radios, power circuitry, and other circuitry used to access a wireless network. The network access circuitry 408 may process firmware/device-level instructions from the network access circuitry instruction engine 406 and/or other modules of the wireless network access engine 400.

Figure 5:
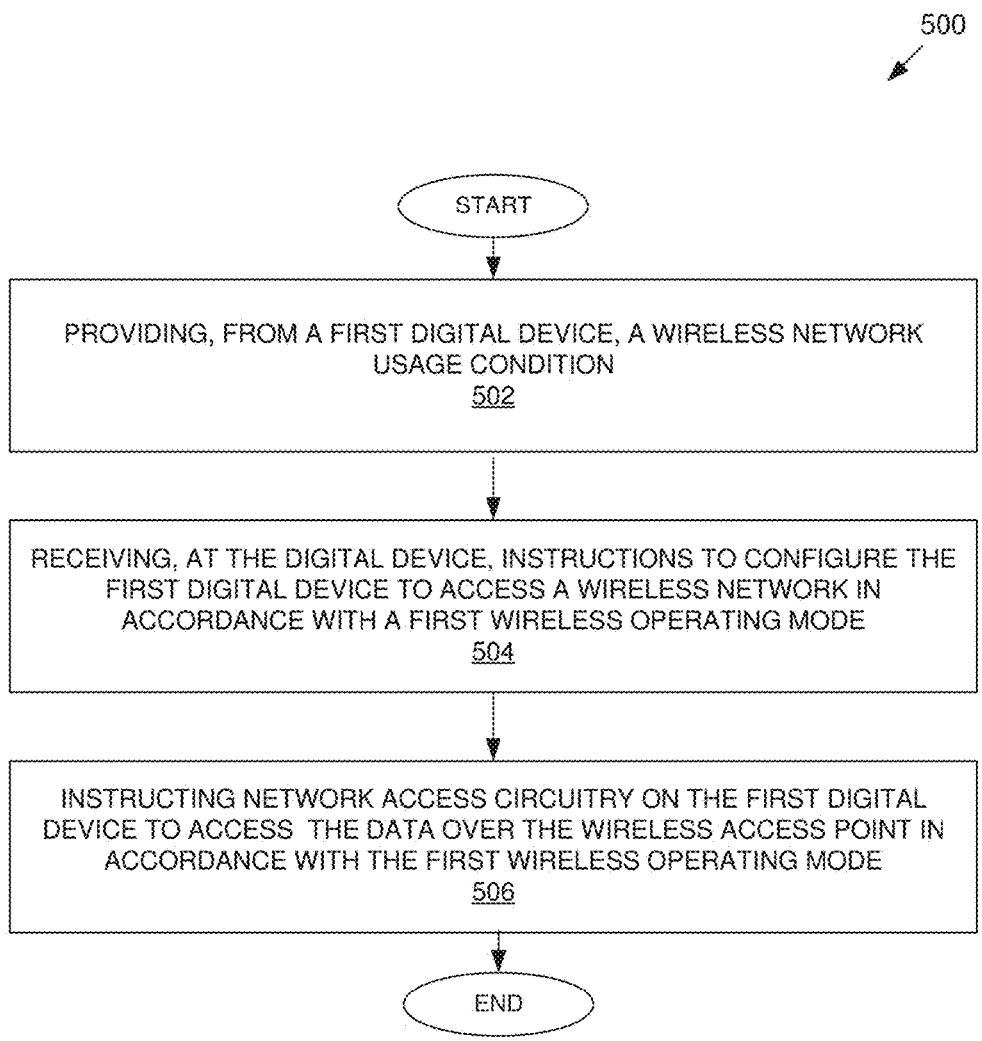
FIG. 5 is a flowchart of an example of a method for instructing network access circuitry on a digital device to access data.

FIG. 5 is a flowchart 500 of an example of a method for instructing network access circuitry on a digital device to access data. The flowchart 500 is discussed in conjunction with the modules of the wireless network access engine 400 shown in FIG. 4 and discussed further herein. It is noted the flowchart 500 may have greater or fewer blocks than those explicitly shown. It is further noted the flowchart 500 may be enabled by structures other than the structures of the wireless network access engine 400.

In the example of FIG. 5, the flowchart 500 starts at block 502 where a wireless network usage condition is provided from a first digital device. In various implementations, the wireless network usage condition monitoring engine 402 may provide a wireless network usage condition to the device configuration instruction engine 404. The wireless network usage conditions may, but need not, provide an indicator of data to be accessed by the first digital device over the wireless access device. In some implementations, the wireless network usage condition may be associated with one or more network access configurations of the digital device. The network access configurations may comprise an IEEE 802.1n MIMO antenna configuration, an 802.11ac Wave1 antenna configuration, an 802.11ac Wave 2 antenna configuration, etc. The network access configuration may, but need not, optimize delivery of video to the first digital device. In some implementations, the network access configuration may optimize desktop virtualizations represented on the digital device. In various implementations, the network access configuration is associated with a specific high-demand region that is characterized by an increased demand for wireless data from the wireless access point in comparison to a demand of a second digital device of the plurality of digital devices.

The flowchart 500 continues to block 504 where instructions to configure the first digital device to access a wireless network in accordance with a first wireless operating mode are received at the first digital device. The device configuration instruction engine 404 may provide instructions to configure the first digital device to access a wireless network in accordance with the first wireless operating mode. In some implementations, the device configuration instruction engine 404 may provide the network access circuitry instruction engine 406 with device configuration instructions. The network access circuitry instruction engine 406 may translate the device configuration instructions into firmware/device-level instructions, that are in turn provided to the network access circuitry 408.

The flowchart 500 continues to block 506 where network access circuitry on the first digital device is instructed to access the data over the wireless access point in accordance with the first wireless operating mode. The network access circuitry 408 may receive appropriate firmware/device-level instructions and may be configured accordingly.

Figure 6:
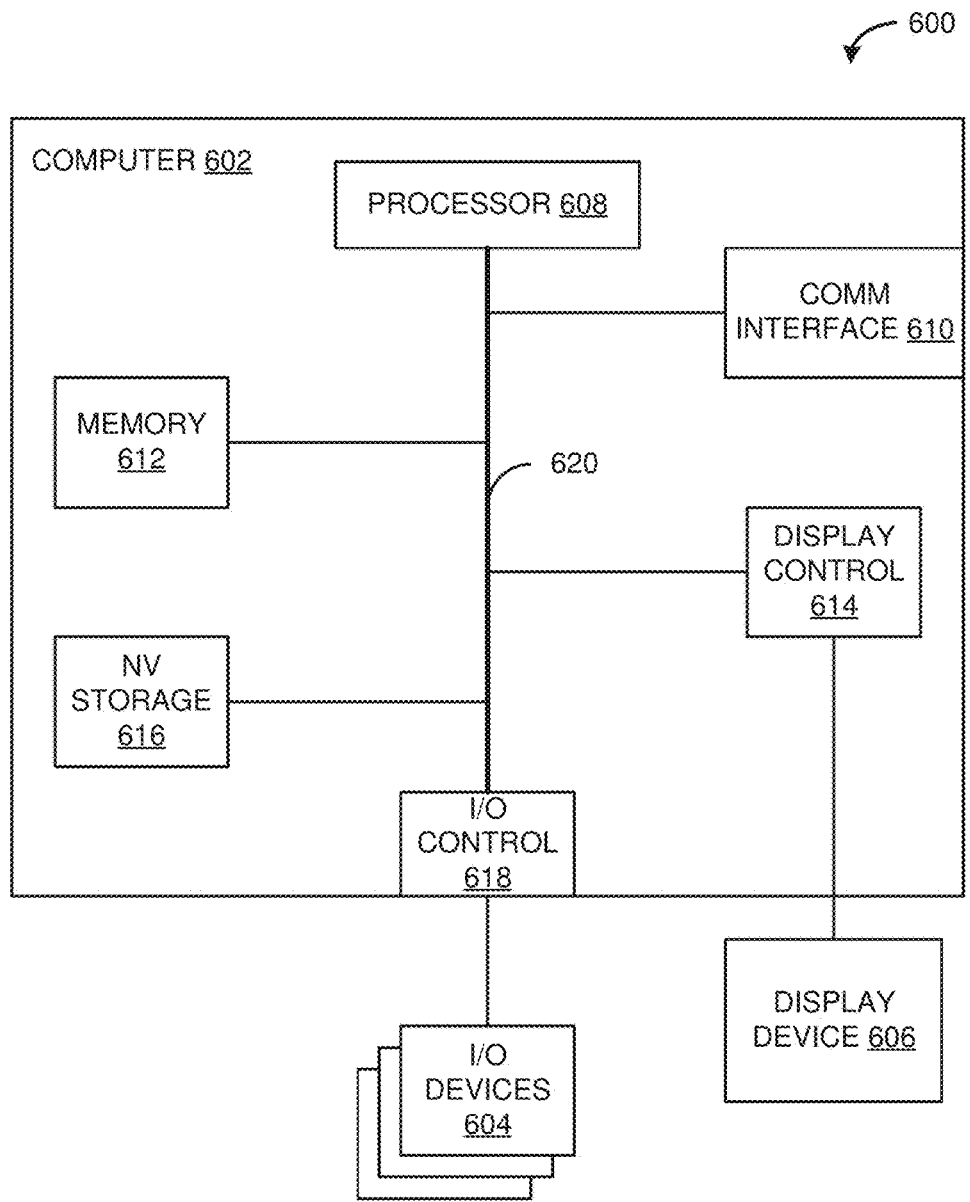
FIG. 6 is a diagram showing an example of a digital device.

FIG. 6 shows a diagram 600 of an example of a digital device. In the example of FIG. 6, the digital device is intended to represent a computer system that can be used as a client computer system, such as a wireless client or a workstation, or a server computer system, when appropriately configured. The diagram 600 includes a computer 602, I/O devices 604, and a display device 606. The computer 602 includes a processor 608, a communications interface 610, memory 612, a display controller 614, non-volatile storage 616, and an I/O controller 618. In the example of FIG. 6, the computer 602 is coupled to or includes the I/O devices 604 and the display device 606.

In an implementation, the computer 602 interfaces to external systems through the communications interface 610, which can include a modem or network interface. It will be appreciated that the communications interface 610 can be considered to be part of the digital device 600 or a part of the computer 602. The communications interface 610 can be an analog modem, ISDN modem, cable modem, token ring interface, satellite transmission interface (e.g. "direct PC"), or other interfaces for coupling a computer system to other computer systems, in various implementations.

In various implementations, the processor 608 can include any processor. In some implementations the processor 608 can include a microprocessor, such as an Intel Pentium® microprocessor or Motorola® power PC microprocessor. The memory 612 can be coupled to the processor 608 by a bus 620. The memory 612 can be Dynamic Random Access Memory (DRAM) and can also include Static RAM (SRAM). The bus 620 can couple the processor 608 to the memory 612, also to the non-volatile storage 616, to the display controller 614, and/or to the I/O controller 618.

In some implementations, the I/O devices 604 can include any devices used to provide input to the digital device 600 or to facilitate outputs from the digital device 600. In various implementations, the I/O device 604 can include one or more of: a keyboard, disk drives, printers, a scanner, and other input and output devices, including a mouse or other pointing device. The display controller 614 can control a display on the display device 606, which can be, for example, a cathode ray tube (CRT) or liquid crystal display (LCD). The display controller 614 and the I/O controller 618 can be implemented with conventional well known technology.

In a specific implementation, the non-volatile storage 616 can include any form of non-volatile storage. In some implementations, the non-volatile storage 616 can include one or more of: magnetic hard disk, an optical disk, or another form of storage for large amounts of data. Some of this data is often written, by a direct memory access process, into memory 612 during execution of software in the computer 602. It is noted that the terms "machine-readable medium" or "computer-readable medium," as used in this paper, can include any type of storage device that is accessible by the processor 608 and also encompasses a carrier wave that encodes a data signal.

In the example of FIG. 6, the digital device 600 is one example of many possible computer systems which have different architectures. For example, personal computers based on an Intel® processor and/or microprocessor can have multiple buses, one of which can be an I/O bus for the peripherals and one that directly connects the processor 608 and the memory 612 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 612 for execution by the processor 608. A Web TV system, which is known in the art, is also considered to be a computer system, but it can lack some of the features shown in FIG. 6, such as certain input or output devices. A typical computer system will usually include at least a processor, memory, and a bus coupling the memory to the processor.

Figure 7:
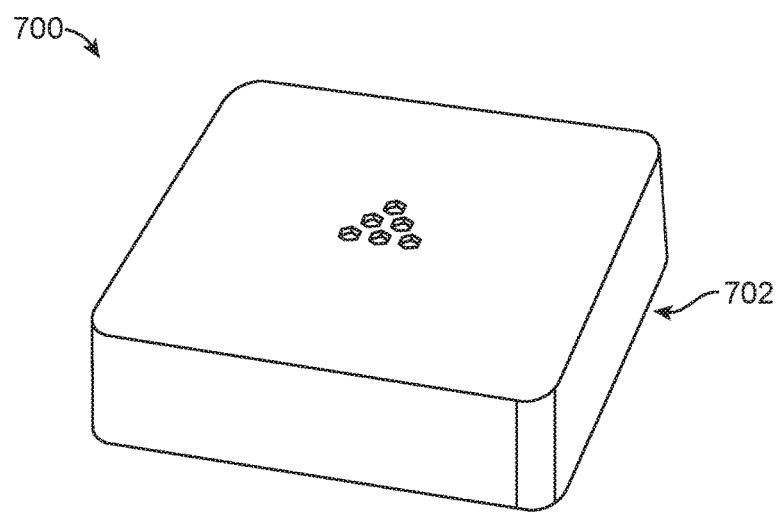
FIG. 7 shows examples of a plurality of network access devices.
Figure 7:
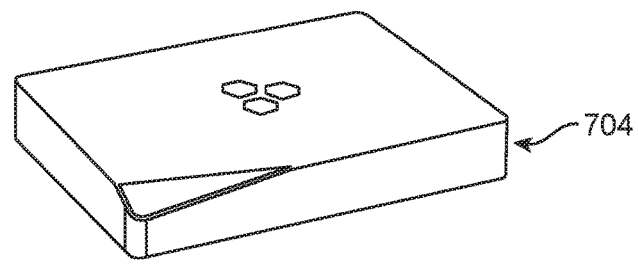
Figure 7:
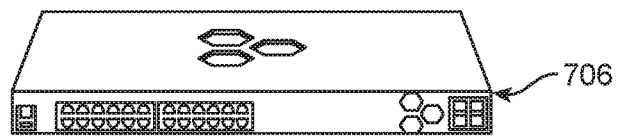

FIG. 7 shows examples of a plurality of network access devices 700. In the example of FIG. 7, the network access devices 700 can include an access point 702, a router 704, and a switch 706. One or more of the access point 702, the router 704, and the switch 706 can contain at least portions of the systems and modules described herein. More specifically, in various implementations, one or more of the access point 702, the router 704, and the switch 706 may correspond to the wireless access device 106, shown in FIG. 1. In some implementations, one or more of the access point 702, the router 704, and the switch 706 can include a wireless mode management engine, described in greater detail herein.

This paper describes techniques that those of skill in the art can implement in numerous ways. For instance, those of skill in the art can implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

A detailed description of one or more implementations of the invention is provided in this paper along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

As disclosed in this paper, implementations allow editors to create professional productions using themes and based on a wide variety of amateur and professional content gathered from numerous sources. Although the foregoing implementations have been described in some detail for purposes of clarity of understanding, implementations are not necessarily limited to the details provided.

What is claimed is:

1. A method performed by a wireless access device, the method comprising:
    gathering identifiers of one or more digital devices coupled to the wireless access device;
    gathering an identifier of a wireless network usage condition of a first digital device of the one or more digital devices, the wireless network usage condition providing an indicator of data to be accessed by the first digital device over the wireless access device;
    gathering an identifier of a power mode for the first digital device, the power mode being associated with the wireless network usage condition of the first digital device;
    selecting a first wireless operating mode of a plurality of wireless operating modes, the plurality of wireless operating modes being related to a plurality of antenna configurations and a plurality of wireless radio frequencies, the selecting of the first wireless operating mode being based on the identified power mode of the first digital device, the first wireless operating mode being associated with a first antenna configuration of the plurality of antenna configurations, and a first wireless radio frequency of the plurality of wireless radio frequencies for the data to be accessed by the first digital device over the wireless access device;

providing instructions to configure the wireless access device to allow the first digital device to access the data in accordance with the first wireless operating mode;

wherein the plurality of wireless radio frequencies comprises a 5.0 Gigahertz (GHz) frequency and a 2.4 Gigahertz (GHz) frequency; and wherein the plurality of wireless operating modes comprises: an Institute of Electrical and Electronics Engineers (IEEE) 802.11n wireless operating mode, and an IEEE 802.11ac wireless operating mode.

2. The method of claim 1, wherein the plurality of antenna configurations comprises a plurality of Multiple Input Multiple Output (MIMO) antenna configurations.

3. The method of claim 1, wherein the plurality of antenna configurations comprises one or more N×N:N antenna configurations, wherein N is any integer.

4. The method of claim 1, wherein the wireless network usage condition is associated with a network access configuration of the first digital device.

5. The method of claim 4, wherein the network access configuration comprises one of an Institute of Electrical and Electronics Engineers (IEEE) 802.11n Multiple Input Multiple Output (MIMO) antenna configuration, and an IEEE 802.11ac single antenna configuration.

6. The method of claim 4, wherein the network access configuration is configured to optimize delivery of video to the first digital device.

7. The method of claim 4, wherein the network access configuration is configured to optimize desktop virtualizations represented on the first digital device.

8. The method of claim 4, wherein:
the one or more digital devices comprises a plurality of digital devices;
the network access configuration is associated with a specific high-demand region, the specific high-demand region being characterized by an increased demand for wireless data from the wireless access device in comparison to a demand of a second digital device of the plurality of digital devices.

9. The method of claim 1, further comprising:
providing, from the first digital device, the wireless network usage condition;
receiving, at the first digital device, the instructions to configure the first digital device in accordance with the first wireless operating mode;
instructing network access circuitry on the first digital device to access the data over the wireless access device in accordance with the first wireless operating mode.

10. A wireless access device comprising:
a digital device identification engine configured to gather from a digital device identification datastore identifiers of one or more digital devices coupled to the wireless access device;
a wireless network usage condition identification engine configured to gather from a wireless network usage condition datastore an identifier of a wireless network usage condition of a first digital device of the one or more digital devices, the wireless network usage condition providing an indicator of data to be accessed by the first digital device over the wireless access device;
a power mode identification engine configured to gather from a power mode identification datastore an identifier of a power mode for the first digital device, the power mode being associated with the wireless network usage condition of the first digital device;
a wireless network operating mode selection engine configured to select a first wireless operating mode of a plurality of wireless operating modes, the plurality of wireless operating modes being related to a plurality of antenna configurations and a plurality of wireless radio frequencies, the selecting of the first wireless operating mode being based on the identified power mode of the first digital device, the first wireless operating mode being associated with a first antenna configuration of the plurality of antenna configurations, and a first wireless radio frequency of the plurality of wireless radio frequencies for the data to be accessed by the first digital device over the wireless access device;
a digital device configuration engine configured to provide instructions to configure the wireless access device to allow the first digital device to access the data in accordance with the first wireless operating mode;
wherein the plurality of wireless radio frequencies comprises a 5.0 Gigahertz (GHz) frequency and a 2.4 Gigahertz (GHz) frequency; and
wherein the plurality of wireless operating modes comprises: an Institute of Electrical and Electronics Engineers (IEEE) 802.11n wireless operating mode, and an IEEE 802.11ac wireless operating mode.

11. The wireless access device of claim 10, wherein the plurality of antenna configurations comprises a plurality of Multiple Input Multiple Output (MIMO) antenna configurations.

12. The wireless access device of claim 10, wherein the plurality of antenna configurations comprises one or more N×N:N antenna configurations, wherein N is any integer.

13. The wireless access device of claim 10, wherein the wireless network usage condition is associated with a network access configuration of the first digital device.

14. The wireless access device of claim 13, wherein the network access configuration comprises one of an Institute of Electrical and Electronics Engineers (IEEE) 802.11 n Multiple Input Multiple Output (MIMO) antenna configuration, and an IEEE 802.11ac single antenna configuration.

15. The wireless access device of claim 13, wherein the network access configuration is configured to optimize streaming video to the first digital device.

16. The wireless access device of claim 13, wherein the network access configuration is configured to optimize desktop virtualizations represented on the first digital device.

17. The wireless access device of claim 13, wherein: the one or more digital devices comprises a plurality of digital devices; the network access configuration is associated with a specific high-demand region, the specific high-demand region being characterized by an increased demand for wireless data from the wireless access device in comparison to a demand of a second digital device of the plurality of digital devices.

18. The wireless access device of claim 10, further comprising:
a wireless network usage condition monitoring engine configured to provide, from the first digital device, the wireless network usage condition;
a digital device configuration engine configured to receive, at the first digital device, the instructions to configure the first digital device in accordance with the first wireless operating mode;
a network access circuitry instruction engine configured to instruct network access circuitry on the first digital device to access the data over the wireless access device in accordance with the first wireless operating mode.

* * * * *